United States Patent
Liu et al.

(10) Patent No.: US 11,773,683 B1
(45) Date of Patent: Oct. 3, 2023

(54) SEGMENTED GROUTING METHOD FOR RAMP DRIVAGE IN AQUIFER

(71) Applicants: NORIN MINING LIMITED, Beijing (CN); University of Science and Technology Beijing, Beijing (CN)

(72) Inventors: Chao Liu, Beijing (CN); Yunpu Qi, Beijing (CN); Zhanglun Song, Beijing (CN); Shuai Zhang, Beijing (CN); Liang Wang, Beijing (CN); Shenghua Yin, Beijing (CN); Fusong Dong, Beijing (CN); Dapeng Chen, Beijing (CN); Leiming Wang, Beijing (CN)

(73) Assignees: NORIN MINING LIMITED, Beijing (CN); University of Science and Technology Beijing, Beijing (CN)

( * ) Notice: Subject to any disclaimer, the term of this patent is extended or adjusted under 35 U.S.C. 154(b) by 0 days.

(21) Appl. No.: 18/124,587

(22) Filed: Mar. 22, 2023

(30) Foreign Application Priority Data

May 26, 2022 (CN) .......................... 202210587377.6

(51) Int. Cl.
  *E21B 33/13* (2006.01)
(52) U.S. Cl.
  CPC .................................. *E21B 33/13* (2013.01)
(58) Field of Classification Search
  CPC ............................... E21B 33/13; E21B 43/14
  USPC .......................................................... 166/285
  See application file for complete search history.

(56) References Cited

U.S. PATENT DOCUMENTS

| 4,548,266 A | * | 10/1985 | Burklund | ............... | E21B 43/14 166/242.6 |
| 5,435,387 A | * | 7/1995 | Roberts | ................... | E21B 17/18 138/114 |
| 6,371,205 B1 | * | 4/2002 | Langan | .................. | E21B 27/02 175/72 |

(Continued)

FOREIGN PATENT DOCUMENTS

| CN | 104131499 A | 11/2014 |
| CN | 109681235 A | 4/2019 |

(Continued)

*Primary Examiner* — William D Hutton, Jr.
*Assistant Examiner* — Ashish Kvarma
(74) *Attorney, Agent, or Firm* — Bayramoglu Law Offices LLC

(57) ABSTRACT

A segmented grouting method for ramp drivage in an aquifer is provided. Concerning grouting reinforcement for a ramp in an aquifer, a grouting process is divided into four stages according to a pressure change, that is, micro-pressure filling, low-pressure diffusion, medium-pressure reinforcement, and high-pressure fracturing. In the micro-pressure filling, an initial pressure of a grouting orifice is 0, and a low-concentration single-component grout is used to fill an original fissure of the aquifer. In the low-pressure diffusion, a low-concentration bicomponent grout is used for grouting, the original fissure is expanded, and a grouting radius is increased. In the medium-pressure reinforcement, a high-concentration bicomponent grout is used for grouting, thereby reinforcing the aquifer. In the high-pressure fracturing, a high-concentration bicomponent grout is used to reinforce a new fractured fissure of the orifice caused by a high pressure and the original fissure, thereby forming a confining bed.

7 Claims, 1 Drawing Sheet

(56) References Cited

U.S. PATENT DOCUMENTS 9,435,188 B2 * 9/2016 Gray .................. E02D 33/00
10,240,432 B2 * 3/2019 Reilly ................ E21B 34/10

FOREIGN PATENT DOCUMENTS

| CN | 110700236 A | 1/2020 |
| JP | S5674180 A | 6/1981 |
| JP | H05321578 A | 12/1993 |

* cited by examiner

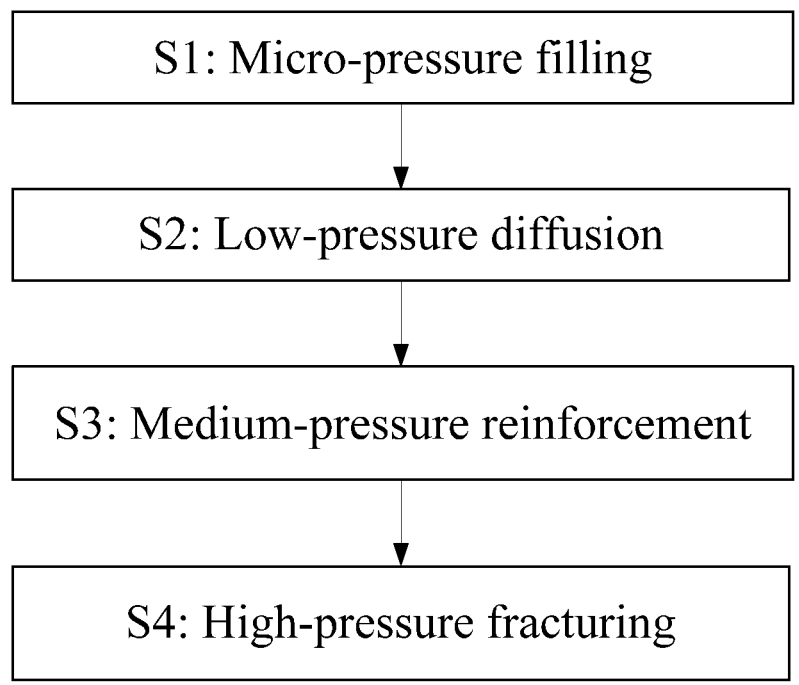

SEGMENTED GROUTING METHOD FOR RAMP DRIVAGE IN AQUIFER

CROSS REFERENCE TO THE RELATED APPLICATIONS

This application is based upon and claims priority to Chinese Patent Application No. 202210587377.6, filed on May 26, 2022, the entire contents of which are incorporated herein by reference.

TECHNICAL FIELD

The present disclosure relates to the technical field of grouting reinforcement for mines, and in particular to a segmented grouting method for ramp drivage in an aquifer.

BACKGROUND

In recent years, with constant exploitation and utilization of mineral resources, unfavorable geological bodies or fault fracture zones occur frequently in the construction field of mines and other underground works. For structures containing a large number of joints, pores and fissures and having a good water transmissibility, the initial stress of the rock mass changes easily for construction disturbances to cause fractures or even damages of the rock mass near the construction site. This will lead to engineering accidents like water inrush and collapse. Hence, for the sake of steady construction of underground works in aquifers, it is crucial to reinforce the unfavorable geological bodies.

Grouting reinforcement has been universally applied to practical engineering applications, and particularly to buildings, hydraulic engineering, mines and tunnels. According to this technique, after the prepared grout is injected into a to-be-grouted rock mass, the grout experiences permeation, diffusion and coagulation to bond or plug the fractures, thereby improving a stability of the rock mass. The grouting reinforcement is effective to prevent water disasters in ramp drivage. However, in response to changes in the depth of the ramp, parameters of a structural plane of surrounding rock and the distribution of the aquifer, effects of the same grouting reinforcement are varied. In view of this, the present disclosure provides a segmented grouting method for ramp drivage in an aquifer. The present disclosure can quantitatively control a grouting process through a grouting pressure, ensure a stability of a rock mass around the ramp in the aquifer, and realize the steady drivage.

SUMMARY

A technical problem to be solved by the present disclosure is to provide a segmented grouting method for ramp drivage in an aquifer. The method can overcome the problem that conventional grouting for ramp drivage cannot be operated normally or cannot achieve the expected engineering effect due to factors such as the aquifer and inaccurate technical parameters, thereby realizing efficient grouting.

A segmented grouting method for ramp drivage in an aquifer includes the following steps:

S1: drilling a borehole on surrounding rock of a to-be-grouted region of a ramp in an aquifer to a designed depth, and providing an orifice pipe and a valve;

S2: performing a grouting process, where the grouting process is divided into four stages according to a change of a grouting pressure:

(1) micro-pressure filling: an initial pressure of a grouting orifice is 0; a cement single-component grout having a water-cement ratio of 4:1 to 3:1 is used; in the stage, an original fissure of the aquifer is preliminarily filled with the low-concentration single-component grout; if the grouting pressure changes within 10-20 min after the start of grouting, the fissure in the borehole is undeveloped or relatively developed; and if the grouting pressure does not change continuously, the fissure in the borehole is developed or well developed;

(2) low-pressure diffusion: the original fissure is further grouted and filled with a cement-water glass bicomponent grout; if the fissure is undeveloped or relatively developed, a mass ratio of cement to water glass is 1:0.4, and a water-cement ratio of the cement grout is 3:1; if the fissure is developed or well developed, the mass ratio of the cement to the water glass is 1:0.5, and the water-cement ratio of the cement grout is 4:1; and in the stage, while the original fissure is filled with the low-concentration bicomponent grout, the grouting pressure rises slowly, the fissure is expanded, and a grouting radius is increased;

(3) medium-pressure reinforcement: a cement-water glass bicomponent grout is used; a mass ratio of cement and water glass is 1:0.4-0.5; a water-cement ratio of the cement grout is 2:1 to 1:1; and in the stage, the fissure is basically filled and reinforced with the high-concentration grout, thereby reinforcing the aquifer; and (4) high-pressure fracturing: a high-concentration cement-water glass bicomponent grout is used for grouting; a water-cement ratio of the cement grout is 2:1 to 1:1; for conventional grouting, a mass ratio of cement to water glass is 1:0.4; for rapid plugging, the mass ratio of the cement to the water glass is 1:0.3; and in the stage, the high-concentration grout is used to reinforce a new fractured fissure of the orifice caused by a high pressure and the original fissure, thereby forming a confining bed; and S3: ending the grouting when a final pressure is reached, and a grout intake is less than 30 L/min for 20 min, and making sure that the grout is effectively diffused and coagulated in the fissure of the surrounding rock to form a grouting curtain region, thereby achieving a designed grouting effect.

Trepanning is used during borehole drilling in S1, that is, a water-prospecting hole is increased on the basis of the original borehole.

The grouting pressure is used as a standard for various stages in S2; and specifically, the grouting pressure in the micro-pressure filling is 0, the low-pressure diffusion is achieved when the grouting pressure is ⅓ of the final pressure, the medium-pressure reinforcement is achieved when the grouting pressure is ⅔ of the final pressure, and the high-pressure fracturing is achieved when the final pressure is reached.

During the grouting process in S2, a flow velocity of the grout is unchanged, and a grouting speed is 40-60 L/min.

For the micro-pressure filling and the low-pressure diffusion in S2, a fissure filling rate is positively correlated with the grouting pressure.

For the high-pressure fracturing in S2, the new fissure does not communicate with the original fissure under an action of the high-pressure fracturing, and there is no new water-conducting passage.

The final pressure in S3 is 2-4 times a hydrostatic pressure, an upper limit or even a higher value is used when the hydrostatic pressure is low, and an intermediate value is used when the hydrostatic pressure is high.

According to the above-mentioned technical solutions, the present disclosure has the following advantages:

The present disclosure quantitatively controls the grouting process through the grouting pressure, and thus is more advantageous than the common grouting. By quantitatively controlling the grouting process through the grouting pressure, the present disclosure ensures a stability of the surrounding rock in ramp drivage of the aquifer, and can effectively improve the drivage efficiency.

BRIEF DESCRIPTION OF THE DRAWINGS

FIGURE is a flowchart illustrating stages in a segmented grouting method for ramp drivage in an aquifer according to the present disclosure.

DETAILED DESCRIPTION OF THE EMBODIMENTS

To make the to-be-solved technical problems, technical solutions, and advantages of the present disclosure clearer, the present disclosure will be described in detail below with reference to the accompanying drawings and specific embodiments.

The present disclosure provides a segmented grouting method for ramp drivage in an aquifer, including the following steps:

A borehole is drilled on surrounding rock of a to-be-grouted region of a ramp in an aquifer to a designed depth, and an orifice pipe and a valve are provided.

A grouting process is performed. The grouting process is divided into four stages according to a change of a grouting pressure (as shown in FIGURE):

(1) Micro-pressure filling: An initial pressure of a grouting orifice is 0. A cement single-component grout having a water-cement ratio of 4:1 to 3:1 is used. In the stage, an original fissure of the aquifer is preliminarily filled with the low-concentration single-component grout. If the grouting pressure changes within 10-20 min after the start of grouting, the fissure in the borehole is undeveloped or relatively developed. If the grouting pressure does not change continuously, the fissure in the borehole is developed or well developed.

(2) Low-pressure diffusion: The original fissure is further grouted and filled with a cement-water glass bicomponent grout. If the fissure is undeveloped or relatively developed, a mass ratio of cement to water glass is 1:0.4, and a water-cement ratio of the cement grout is 3:1. If the fissure is developed or well developed, the mass ratio of the cement to the water glass is 1:0.5, and the water-cement ratio of the cement grout is 4:1. In the stage, while the original fissure is filled with the low-concentration bicomponent grout, the grouting pressure rises slowly, the fissure is expanded, and a grouting radius is increased (3) Medium-pressure reinforcement: A cement-water glass bicomponent grout is used. A mass ratio of cement and water glass is 1:0.4-0.5. A water-cement ratio of the cement grout is 2:1 to 1:1. In the stage, the fissure is basically filled and reinforced with the high-concentration grout, thereby reinforcing the aquifer.

(4) High-pressure fracturing: A high-concentration cement-water glass bicomponent grout is used for grouting. A water-cement ratio of the cement grout is 2:1 to 1:1. For conventional grouting, a mass ratio of cement to water glass is 1:0.4. For rapid plugging, the mass ratio of the cement to the water glass is 1:0.3. In the stage, the high-concentration grout is used to reinforce a new fractured fissure of the orifice caused by a high pressure and the original fissure, thereby forming a confining bed.

The grouting is ended when a final pressure is reached, and a grout intake is less than 30 L/min for 20 min. Make sure that the grout is effectively diffused and coagulated in the fissure of the surrounding rock to form a grouting curtain region, thereby achieving a designed grouting effect.

For fear of excessive water yielding from the borehole, trepanning is used during borehole drilling, that is, a water-prospecting hole is increased on the basis of the original borehole.

The grouting pressure is used as a standard for various stages of the grouting. With the final grouting pressure as a reference, the various stages are realized according to the grouting pressure: The grouting pressure in the micro-pressure filling is 0. The low-pressure diffusion is achieved when the grouting pressure is ⅓ of the final pressure. The medium-pressure reinforcement is achieved when the grouting pressure is ⅔ of the final pressure. The high-pressure fracturing is achieved when the final pressure is reached.

During the grouting process, a flow velocity of the grout is unchanged, and a grouting speed is 40-60 L/min. Due to a limit space in the grouting borehole, the pressure rises gradually after the fissure is filled by the grout.

For the micro-pressure filling and the low-pressure diffusion, a fissure filling rate is positively correlated with the grouting pressure.

For the high-pressure fracturing, the new fissure does not communicate with the original fissure under an action of the high-pressure fracturing, and there is no new water-conducting passage.

The final pressure is 2-4 times a hydrostatic pressure. An upper limit or even a higher value is used when the hydrostatic pressure is low. An intermediate value is used when the hydrostatic pressure is high.

The disclosure is described in detail below with reference to the specific examples.

Example 1

For a water-yielding section on a ramp of a mine, there is a stratum with clear rock stratification and developed fissures. The fissure plane tends to have a strike of vertical roadways. For nearly upright dip angles, calcite veins are filled most. With sandy and argillaceous textures, solution caves are developed locally and densely. This stratum is the main water-bearing stratum of the ramp and is abundant in water. The water pressure is about 0.8 MPa, and the total water drenching amount is about 110 m$^3$/h.

When the ramp is constructed to the stratum, many fissure zones occur with rich underground water. The water is mainly arising from roof water inrush and water drenching, and appears as lines or rainstorms. Segmented grouting is performed on a water drenching section, and pressure grouting is used. The final grouting pressure is 2-4 times a hydrostatic pressure in principle. Since the water pressure is 0.8 MPa, the final grouting pressure is 3.0 MPa based on the grouting experience.

A (108 mm borehole having a depth of 1-1.5 m was drilled at a site to be grouted. A (90 mm orifice pipe and a valve were provided. After the orifice pipe was firm, a (64 mm water-prospecting hole was trepanned to prevent excessive water yielding in borehole drilling.

A grouting process was divided into four stages according to a change of a grouting pressure:

1) Micro-pressure filling: An initial pressure of a grouting orifice was 0. A cement single-component grout having a water-cement ratio of 3:1 was used. In the stage, an original fissure of the aquifer was preliminarily filled with the low-concentration grout. Through changes in pressure and grouting time, it was determined that the fissure in the grouting borehole was undeveloped or relatively developed.

2) Low-pressure diffusion: A pressure threshold of the grouting orifice was 0-1.0 MPa. The original fissure was further grouted and filled with a cement-water glass bicomponent grout. According to a degree of development for the fissure in the grouting borehole, a ratio of cement to water glass was 1:0.4, and a water-cement ratio of the cement grout was 3:1. In the stage, while the original fissure was filled with the low-concentration grout, the grouting pressure rose slowly, the fissure was expanded, and a grouting radius was increased.

3) Medium-pressure reinforcement: A pressure threshold of the grouting orifice was 1.0-2.0 MPa. A cement-water glass bicomponent grout with a ratio of 1:0.4 was used. A water-cement ratio of the cement grout was 1:1. While the grouting radius was expanded, the fissure was basically filled and reinforced with the high-concentration grout. In this case, the stratum has a low groutability, the grouting pressure further rose, and the aquifer was further reinforced.

4) High-pressure fracturing: The grouting orifice had a pressure of greater than 2.0 MPa. A cement-water glass bicomponent grout having a ratio of 1:0.3 was used. A water-cement ratio of the cement grout was 1:1. In the stage, the orifice of the aquifer was fractured for a high grouting pressure to form a new fissure. The original fissure and the fractured fissure were quickly reinforced by the high-concentration grout to form a confining bed.

The grouting speed was 40 L/min during the grouting process. Changes of the grouting pressure and the grout intake were observed. When the designed final pressure of 3.0 MPa was reached and the grout intake was less than 30 L/min for 20 min, the grouting was ended. One or two inspection holes were drilled nearby to check the grouting effect. The grouting was not ended until surrounding fissures of the roadway were plugged reliably.

The above described are preferred implementations of the disclosure. It should be noted that a person of ordinary skill in the art may further make several improvements and modifications without departing from the principle of the disclosure, but such improvements and modifications should also be deemed as falling within the protection scope of the disclosure.

What is claimed is:

1. A segmented grouting method for ramp drivage in an aquifer, comprising the following steps:
    A: drilling a borehole on a surrounding rock of a to-be-grouted region of a ramp in the aquifer to a designed depth, and providing an orifice pipe and a valve;
    B: performing a grouting process, wherein the grouting process is divided into four stages according to a change of a grouting pressure:
        (1) micro-pressure filling: an initial pressure of a grouting orifice is 0; a cement single-component grout having a water-cement ratio of 4:1 to 3:1 is used; in the stage, an original fissure of the aquifer is preliminarily filled with a low-concentration single-component grout; if the grouting pressure changes within 10-20 min after a start of grouting, the fissure in the borehole is undeveloped or relatively developed; and if the grouting pressure does not change continuously, the fissure in the borehole is developed or well developed;
        (2) low-pressure diffusion: the original fissure is further grouted and filled with a cement-water glass bicomponent grout; if the fissure is undeveloped or relatively developed, a mass ratio of cement to water glass is 1:0.4, and a water-cement ratio of a cement grout is 3:1; if the fissure is developed or well developed, the mass ratio of the cement to the water glass is 1:0.5, and the water-cement ratio of the cement grout is 4:1; and in the stage, while the original fissure is filled with a low-concentration bicomponent grout, the grouting pressure rises slowly, the fissure is expanded, and a grouting radius is increased;
        (3) medium-pressure reinforcement: the cement-water glass bicomponent grout is used; the mass ratio of the cement to the water glass is 1:0.4-0.5; the water-cement ratio of the cement grout is 2:1 to 1:1; and in the stage, the fissure is basically filled and reinforced with a high-concentration grout, thereby reinforcing the aquifer; and
        (4) high-pressure fracturing: a high-concentration cement-water glass bicomponent grout is used for grouting; the water-cement ratio of the cement grout is 2:1 to 1:1; for conventional grouting, the mass ratio of the cement to the water glass is 1:0.4; for rapid plugging, the mass ratio of the cement to the water glass is 1:0.3; and in the stage, the high-concentration grout is used to reinforce a new fractured fissure of the orifice caused by a high pressure and the original fissure, thereby forming a confining bed; and
    C: ending the grouting when a final pressure is reached, and a grout intake is less than 30 L/min for 20 min, and making sure that the grout is effectively diffused and coagulated in the fissure of the surrounding rock to form a grouting curtain region, thereby achieving a designed grouting effect.

2. The segmented grouting method for ramp drivage in the aquifer according to claim 1, wherein trepanning is used during borehole drilling in A, and a water-prospecting hole is increased on the basis of the original borehole.

3. The segmented grouting method for ramp drivage in the aquifer according to claim 1, wherein the grouting pressure is used as a standard for various stages in B; and specifically, the grouting pressure in the micro-pressure filling is 0, the low-pressure diffusion is achieved when the grouting pressure is ⅓ of the final pressure, the medium-pressure reinforcement is achieved when the grouting pressure is ⅔ of the final pressure, and the high-pressure fracturing is achieved when the final pressure is reached.

4. The segmented grouting method for ramp drivage in the aquifer according to claim 1, wherein during the grouting process in B, a flow velocity of the grout is unchanged, and a grouting speed is 40-60 L/min.

5. The segmented grouting method for ramp drivage in the aquifer according to claim 1, wherein for the micro-pressure filling and the low-pressure diffusion in B, a fissure filling rate is positively correlated with the grouting pressure.

6. The segmented grouting method for ramp drivage in the aquifer according to claim 1, wherein for the high-pressure fracturing in B, the new fissure does not communicate with the original fissure under an action of the high-pressure fracturing, and no new water-conducting passage is formed.

7. The segmented grouting method for ramp drivage in the aquifer according to claim 1, wherein the final pressure in C is 2-4 times a hydrostatic pressure.

* * * * *